Patented Feb. 10, 1931

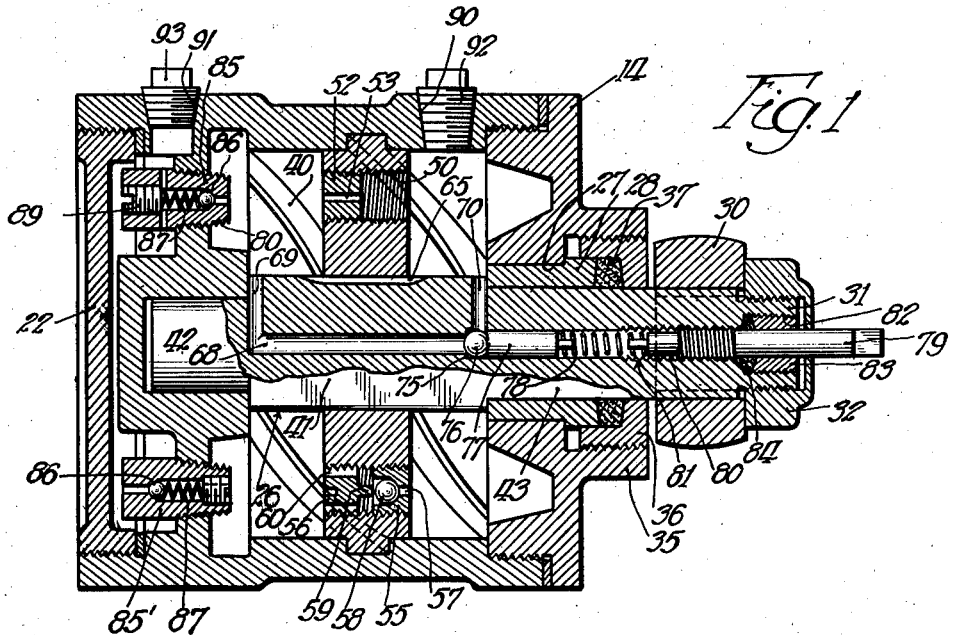
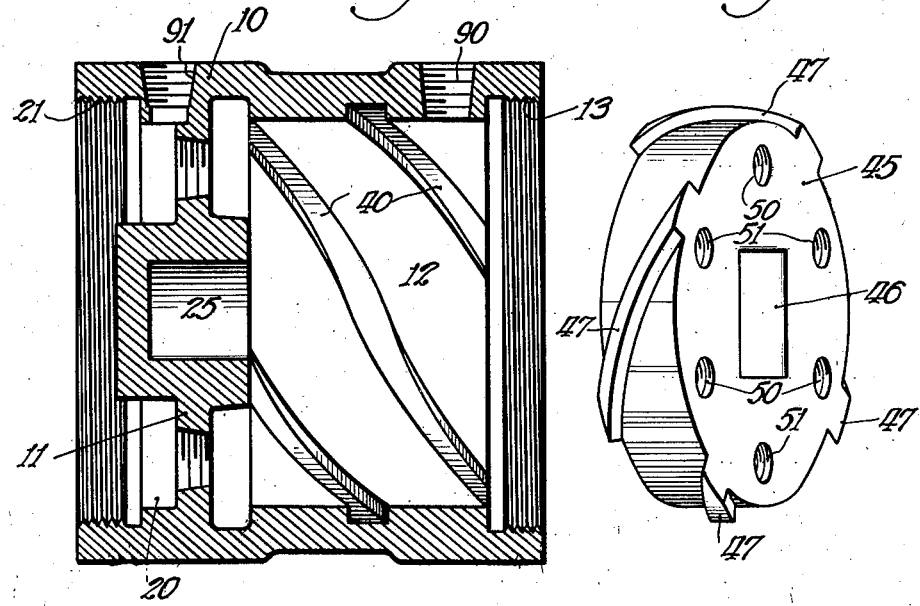

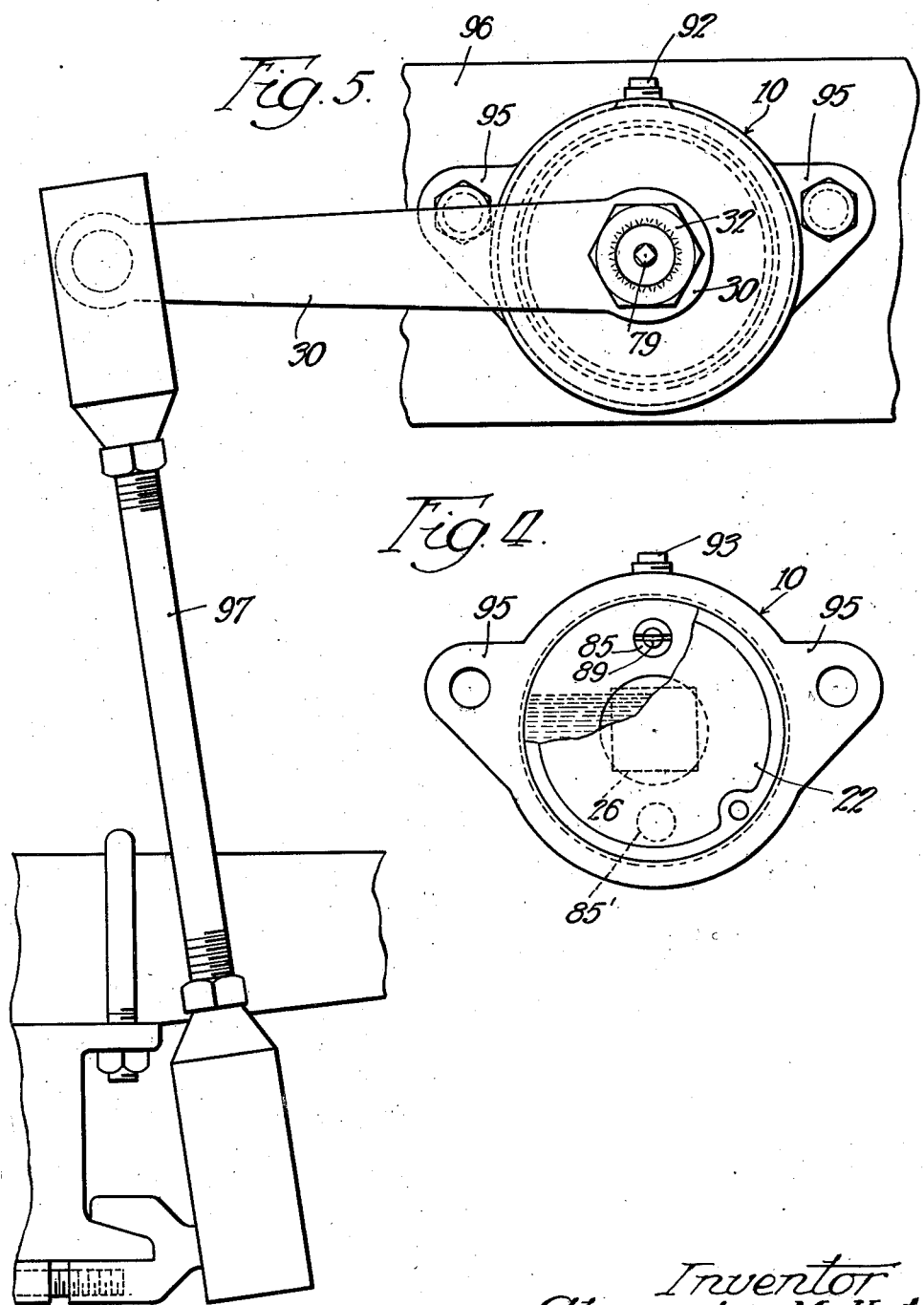

1,792,111

UNITED STATES PATENT OFFICE

ALEXANDER McNAB, OF BRIDGEPORT, CONNECTICUT, ASSIGNOR TO McNAB ABSORBO-LIFT, INC., OF NEW YORK, N. Y., A CORPORATION OF NEW YORK

PISTON DEVICE APPLICABLE TO SHOCK ABSORBERS

Application filed March 15, 1929. Serial No. 347,256.

This invention relates to new or improved shock absorber, and is directed more particularly to a shock absorber for suspension systems of road vehicles.

A primary object of the present invention is to provide an improved shock absorber of a small and compact form and which at the same time will provide for maximum efficiency in checking and controlling the action of a vehicle suspension system.

In road vehicle shock absorbers of the rotary type as at present generally in use, it is customary to provide one or more vanes on a shaft which is mounted axially in a cylinder having fixed vanes extending inwardly between the movable vanes of the shaft. With such an arrangement it is necessary to operate the shock absorber under high fluid pressure in view of the relatively small vane area and also in view of the relatively small volume of fluid that is displaced after a given angular movement of the vanes. Such high pressure operation necessarily results in the utilization of comparatively thick or bulky vanes in order to adequately support their free ends, and this strengthening of the vanes further reduces the fluid capacity of the cylinder. The high pressure operation also necessitates the machining of the parts to a very fine degree of accuracy and also necessitates the use of very small passages for transferring the fluid from one side of the vanes to the other. The use of small transfer passages tends to heat up the fluid in its passage therethrough to an extent such that after continued or heavy use the fluid alters in consistency and may even become vaporized, with the result that the action of such shock absorbers is not constant and may under some conditions result in heavy riding, owing to an undue checking of the movements of the vehicle springs, and under other conditions may insufficiently check the movements of such springs.

A particular object of the present invention is to provide a rotary type shock absorber of small dimensions that will operate at comparatively low pressures, thereby assuring even and regular operation under all conditions, and also avoiding the necessity for constructing the parts to within extremely fine limits of accuracy. A further object of the present invention is to provide a rotary type shock absorber that can be operated effectively with oil as the hydraulic medium, preferably oil of a light grade and which can be subjected to low temperatures without material alteration to its consistency.

A further object of the present invention is to provide a shock absorber, which obtains the above objects, and which is of a compact form having few parts of rugged construction that can be readily manufactured and assembled at a low cost.

Other objects and advantages will be apparent to those skilled in the art from the following description relative to the accompanying drawings, which show a preferred embodiment of the present invention as applied to a shock absorber for road vehicles, and in which Figure 1 is a sectional elevation of the complete shock absorber;

Figure 2 is a sectional elevation of the cylinder member;

Figure 3 is a perspective view of the piston;

Figure 4 is a part sectional rear elevation of the shock absorber;

Figure 5 is a front elevation of the shock absorber illustrating, in a conventional manner, its connection with elements of the running gear and with the body or chassis of a vehicle.

The device illustrated comprises a body member 10 which is of generally cylindrical formation open at each end and has a web-like partition 11 near the rear end. The interior of the front end is machined to accurately cylindrical form at 12 to form a working cylinder, the extremity of the front end being of enlarged diameter and screw threaded at 13 for the reception of a cover plate 14.

The rear end of the body member 10 forms an expansion chamber 20, and the extremity of said rear end is of enlarged diameter and formed with screw threads at 21 for the reception of a cover plate 22.

The partition 11 is formed with a cylindrical recess 25 at its center which opens into the working cylinder 12 and constitutes a journal bearing for the end of a shaft 26 which extends through an aperture 27 in the cover plate 14 and is journalled in a bearing 28 located in said aperture. The externally projecting end of the shaft 26 is serrated for receiving a crank arm 30 which constitutes an operating member for rotating said shaft. The reduced extremity 31 of said shaft is screw threaded for receiving a nut 32 which engages the crank arm 30 and maintains same in position. The cover plate 14 is provided on its exterior with a cylindrical flange 35 which is screw threaded for receiving an annular gland member 36 which cooperates with the end of the bearing 28 to form a housing for packing 37.

The cylindrical surface of the working chamber 12 is formed with four helical grooves 40 of rectangular cross section. The portion 41 of the shaft which lies between the partition 11 and the cover plate 14 is of square cross section and is enlarged relative to the journal portions 42 and 43 of said shaft which respectively engage with the journal bearings 25 and 28. Mounted within said working cylinder 12 is a piston 45 having a square axial aperture 46 which is a close sliding fit on the portion 41 of the shaft 26. The peripheral edges of the piston are in close sliding engagement with the cylindrical surface of the working chamber and are provided with four screw threads 47 of rectangular cross section for cooperating with the grooves 40 in the cylinder. A plurality of apertures 50 and 51 in the piston are located around the square central aperture 46. These apertures are screw threaded for the reception of plug-like devices for controlling the flow of fluid therethrough. Certain of these apertures, namely, the apertures 50, receive flow-controlling plugs 52 which each have a small calibrated orifice 53 extending therethrough. The other apertures, namely, apertures 51, each receive two flow-controlling plugs 55 and 56. Plug 55 is provided with a calibrated aperture 57 on one side and on the other side said plug is enlarged to form a seat for a ball valve 58. Plug 56 is adapted to maintain the ball valve 58 in position, and is provided with a projection 59 for limiting the movement of said ball valve away from its seat, and said plug 56 is also provided with grooves 60 on its periphery for the passage of fluid therethrough.

The surface of the portion 41 of the shaft is provided with a groove 65 which is of slightly greater length than the width of the piston 45 so that the ends of said groove will be open to the surface of said shaft and will communicate with the working cylinder space on either side of the piston when said piston is in a position midway between the ends of the working cylinder 12, and thereby will permit free transference of fluid from one side of said piston to the other until said piston has been displaced sufficiently from its central position to close off one of the ends of said groove. The shaft 26 is provided with an axial passage 68 which communicates at one end by way of a radial passage 69 with the surface of the portion 41 of the shaft adjacent one end of the cylinder 12. The passage 68 communicates at its other end by way of a radial passage 70 with the surface of the portion 41 of the shaft at the other end of the working cylinder. The passage 68 is formed with an internal shoulder 75, preferably located near its forward end, and which forms a seat for a ball valve 76. Said ball valve 76 is normally pressed into engagement with said shoulder by means of a plug 77 which is engaged at one end by a coil spring 78, the coil spring 78 being engaged at its other end by an adjustment shaft 79 which has a screw threaded engagement at 80 with an axial bore 81 in the front end of the shaft 26. The bore 81 also houses the plug 77 and spring 78. The forward end of the adjusting shaft 79 projects beyond the end of the shaft 26 and may be squared for the reception of a key or other device for enabling it to be rotated. The bore 81 is enlarged and screw threaded at its front end 82 for the reception of a gland member 83 which serves to retain packing 84 for making a fluid tight engagement with the adjusting shaft 79.

The partition 11 is formed on its upper side with a screw threaded aperture which receives a valve member 85. The valve member 85 is provided with a ball valve 86 and a seat therefor which faces the expansion chamber 20. The ball valve 86 is normally maintained on its seat by a relatively strong coil spring 87 which abuts against a plug 89 in the valve member 85. The lower side of the partition 11 is formed with an aperture for receiving a valve member 85' which is similar to the valve member 85, but which has the valve seat 86 facing in the opposite direction. The valve spring 87 of valve member 85' is of relatively weak strength.

The upper side of the body member 10 is provided with filling apertures 90 and 91 communicating respectively with the working cylinder 12 and the expansion chamber 20, and said apertures 90 and 91 are respectively provided with closure plugs 92 and 93. The rear end of the body member 10 is provided with flanges 95 for enabling it to be secured to the chassis 96 of the vehicle, and the end of the crank arm 30 is adapted for connection with the axle or suspension spring of the vehicle through a rod of any suitable form such as illustrated at 97, it being understood that said rod will transmit both upward and downward movements of the spring and axle to the crank 30.

In operation the working cylinder 12 is filled completely with hydraulic fluid through the filling orifice 90, and the expansion chamber 20 is half filled with said hydraulic fluid through the filling orifice 91, the level of the hydraulic fluid in the expansion chamber 20 is illustrated in Figure 4. A light grade oil of low cold test may be advantageously employed for the hydraulic medium.

Deflection of the suspension spring of the vehicle in either direction will cause rotation of the shaft 26 in a corresponding direction. This rotation of the shaft will be transmitted to the piston 45, and the rotation of the piston will cause it to move axially along the shaft and along the cylinder 12 by reason of the engagement of the screw threads 47 with the helical grooves 40. When the vehicle springs are in normal position the piston 45 will be in central position as illustrated in Figure 1, and a limited displacement of the springs in either direction can take place freely without restriction by the shock absorber, owing to the provision of the groove 65 in the surface of the shaft. This groove 65 thus provides for smooth flexible riding on evenly paved roads, such as is commonly known as boulevard riding.

When the vehicle springs are deflected sufficiently to move the piston and extend sufficient to cause it to cover an end of the groove 65, it will be appreciated that said groove becomes closed and can no longer serve as a fluid transfer passage. When the piston is moving towards the left of Figure 1 the fluid in the left hand end of the working cylinder 12 can, normally, only escape through the calibrated orifices 53 in the transfer plugs 52, and it will be readily understood that the restricted size of the orifices 53 will effectively prevent rapid movement of the piston and accordingly after the initial amount of deflection allowed for boulevard riding the vehicle springs will be prevented or restrained from further rapid deflection. When the piston is moved to the right hand end of Figure 1, by reverse deflection of the vehicle springs, the said deflection is, after initial movement which is allowed for the boulevard riding, similarly restricted or prevented from rapid movement, although movement in this direction is restrained to a lesser extent owing to the fluid in the right hand end of the working cylinder being permitted to pass through the piston by way of the orifices 57 in the transfer plugs 55 as well as through the orifices in the transfer plugs 52, it being understood that the pressure of fluid in the right hand end of the cylinder will displace the ball valves 58 from their seats. The crank 30 may be advantageously coupled with the vehicle axle or springs in such a manner that the piston is moved towards the left hand of Figure 1 when the road wheels encounter a depression in the road surface, the rebound of the car body causing the piston to move towards the right hand end of Figure 1.

Under normal conditions the ball valves 76 in the fluid transfer passage 68 will remain seated, the spring 78 being of a substantial strength, but in the event of any abnormal pressure being developed, the ball valve 76 will be displaced from its seat by said pressure against the action of the spring 78, and will thereby afford relief. The member 79 enables the action of the spring 78 to be readily adjusted to suit varying conditions of operation.

Under normal conditions both of the two valves 86 will remain closed, but should the fluid in the working chamber 12 escape or become reduced in volume for any reason, the movement of the piston towards the right hand end of Figure 1 will produce a suction in the working chamber to the left hand side of the piston, and the valve 86 in the valve member 85' will be lifted from its seat and a reserve quantity of fluid will be drawn into the working chamber 12 from the lower portion of the expansion chamber 20. Should the working fluid in the chamber 12 increase in volume owing to vaporization or any other cause, the increased pressure will unseat the valve in the valve member 85 and allow a discharge of fluid into the expansion chamber 20. It is to be understood, however, that the spring 87 in the valve member 85 is of sufficient strength to maintain the valve 86 in engagement with its seat against any pressures such as are normally developed by the displacement of the piston, and that as soon as the excess volume of fluid is discharged from the working cylinder 12 the valve 86 of the valve member 85 will immediately engage with its seat and prevent further discharge of fluid therethrough.

I claim:

1. A device for controlling the operation of vehicle suspension systems, said device comprising a cylinder, a shaft mounted for rotation in said cylinder, a piston in said cylinder for axial movement therein, said piston having a screw thread engagement with said cylinder and a sliding engagement with a non-circular portion of said shaft, said shaft extending externally of said cylinder for connection with an operating member for rotating same, fluid transfer means permitting transference of fluid in said cylinder from either side of said piston to the other side thereof and including a valve device for partially restricting the fluid transference in one direction, said aforementioned transfer means permitting at least partial transfer of fluid for all positions of said piston in said cylinder, and a further fluid transfer means including a passage in said shaft open to the surface thereof at least at its ends and having said ends located at a short distance from the normal position of said piston for being closed by said piston on a given deflection thereof from said normal position.

2. A device for controlling the operation of vehicle suspension systems, said device comprising a cylinder, a shaft mounted for rotation in said cylinder, a piston in said cylinder for axial movement therein, said piston having a screw thread engagement with said cylinder and a sliding engagement with a non-circular portion of said shaft, said shaft extending externally of said cylinder for connection with an operating member for rotating same, fluid transfer means permitting transference of fluid in said cylinder from one side of said piston to the other side thereof, said fluid transfer means including a passage in said shaft open to the surface thereof at least at its ends and having said ends located at a short distance from the normal position of said piston for being closed by said piston on a given deflection thereof from said normal position, said fluid transfer means also including a passage in said shaft with the ends of said passage communicating with the surface of said shaft at points at or beyond the limits of axial movement of said piston, control means in said last mentioned passage for controlling the flow of fluid therethrough, and means operable from the externally extending end of said shaft for adjusting said control means.

3. A device for controlling the operation of vehicle suspension systems, said device comprising a cylinder, a shaft mounted for rotation in said cylinder, a piston in said cylinder for axial movement therein, said piston having a screw thread engagement with said cylinder and a sliding engagement with a non-circular portion of said shaft, said shaft extending externally of said cylinder for connection with an operating member for rotating same, and fluid transfer means permitting transference of fluid in said cylinder from either side of said piston to the other side thereof and including at least one aperture extending through said piston and a valve device for partially restricting the fluid transference in one direction, a second fluid transfer means including a passage in said shaft open to the surface thereof at least at its ends and having said ends located at a short distance from the normal position of said piston for being closed by said piston on a given deflection thereof from said normal position, a third fluid transfer means including a passage in said shaft with the ends of said passage communicating with the surface of said shaft at points at or beyond the limits of axial movement of said piston, control means in said last mentioned passage for controlling the flow of fluid therethrough, and means operable from the externally extending end of said shaft for adjusting said control means.

4. A vehicle shock absorber comprising, in combination, a cylinder for containing working fluid, a piston movable axially in said cylinder, means permitting controlled transference of working fluid in said cylinder from one side thereof to the other side thereof, an expansion chamber at one end of said cylinder for being partially filled with working fluid, a partition separating said expansion chamber from said cylinder, outlet and inlet passage communicating said cylinder with said expansion chamber with said inlet passage disposed below the level of working fluid in said expansion chamber, valve means in said outlet passage permitting working fluid to flow therethrough only in a direction from said cylinder to said expansion chamber, a relatively strong spring means normally maintaining said valve means closed, a second valve means in said inlet passage permitting working fluid to flow therethrough only in a direction from said expansion chamber to said cylinder, a relatively weak spring means normally maintaining said second valve means closed.

5. A shock absorber housing comprising, in combination, a tubular body member open at each end, a partition in said body member near one end partitioning the interior thereof into a major and a minor compartment, a removable cover member for closing each end of said body member, a machined cylindrical surface in said major compartment, an axial aperture extending through the cover member for the major compartment end of said body member and having a journal bearing therein, a machined cylindrical axial aperture in the partition on the major compartment side thereof forming a second journal bearing, and a closed end for said aperture in said partition for preventing passage of fluid through said bearing to and from said major and minor chambers.

6. A device for controlling the operation of a vehicle suspension system, said device comprising a cylinder, a shaft extending into said cylinder, a piston in said cylinder, means for causing rotational movement between said shaft and cylinder to transmit to said piston an axial movement relative to said cylinder, fluid transfer means permitting transference of fluid in said cylinder from either side of said piston to the other side thereof, said fluid transfer means including a valve device for restricting the fluid transference in one direction, said transfer means permitting at least partial transfer of fluid for all working positions of said piston in said cylinder, and a further fluid transfer means including a passage in said shaft open to the surface thereof at least at its ends and having said ends located at a short distance from the normal position of said piston for being closed by said piston on a given deflection thereof from said normal position.

7. A vehicle shock absorber comprising, in combination, a cylinder for containing working fluid, a piston movable axially in said cylinder, means permitting controlled transference of working fluid in said cylinder from one side thereof to the other side thereof, an expansion chamber at one end of said cylinder for being partially filled with working fluid, a partition separating said expansion chamber from said cylinder, outlet and inlet passages communicating said cylinder with said expansion chamber, said inlet passage being of substantial cross-sectional area and disposed below the level of working fluid in said expansion chamber, a valve means in said inlet passage permitting ready flow of working fluid therethrough in a direction from said expansion chamber to said cylinder, said valve means preventing flow of fluid therethrough in the reverse direction, said outlet passage permitting only relatively restricted flow of fluid therethrough.

In testimony whereof I affix my signature hereto.

ALEXANDER McNAB.